United States Patent [19]

Noguchi et al.

[11] Patent Number: 5,394,743
[45] Date of Patent: Mar. 7, 1995

[54] METHOD AND APPARATUS FOR CONTROLLING A ROBOT TO SIMULATE DRIVING OF A MOTORCAR

[75] Inventors: Shinji Noguchi, Otokuni; Tokihiro Tsukamoto, Kyoto, both of Japan

[73] Assignee: Horiba, Ltd., Japan

[21] Appl. No.: 58,415

[22] Filed: May 7, 1993

[30] Foreign Application Priority Data

May 9, 1992 [JP] Japan ................. 4-143234

[51] Int. Cl.6 ........................................... G01M 17/00
[52] U.S. Cl. .................. 73/117; 364/426.01; 364/426.04; 901/3
[58] Field of Search ........... 73/117; 901/46, 3; 364/426.01, 426.04

[56] References Cited

U.S. PATENT DOCUMENTS

| | | | |
|---|---|---|---|
| 4,495,801 | 1/1985 | Sugimoto | 73/117 |
| 4,621,525 | 11/1986 | King et al. | 73/117 |
| 5,128,599 | 7/1992 | Nikolaus et al. | 364/426.03 |
| 5,193,062 | 3/1993 | Murase et al. | 73/117 X |
| 5,270,628 | 12/1993 | Noguchi et al. | 364/426.04 |

FOREIGN PATENT DOCUMENTS

| | | | |
|---|---|---|---|
| 2004979 | 2/1970 | Germany | G01M 17/00 |
| 4103579 | 2/1991 | Germany | G01M 17/00 |

*Primary Examiner*—Hezron E. Williams
*Assistant Examiner*—Michael J. Brock
*Attorney, Agent, or Firm*—Poms, Smith, Lande & Rose

[57] ABSTRACT

A method of controlling a robot for testing of a motorcar by the simulated driving thereof, as on a chassis dynamometer. The robot is capable of detecting shifted operating quantities of actuators of the robot to correct the detected shifted quantities, whereby surely achieving operations of pedals and the like of the motorcar by the actuators. In the case where the actuators of the robot are shifted in position during a test driving of the motorcar, these positional shifts are automatically sensed and compensated for during the simulated driving of the motorcar, and the test need not be discontinued or interrupted.

14 Claims, 4 Drawing Sheets

Fig.5
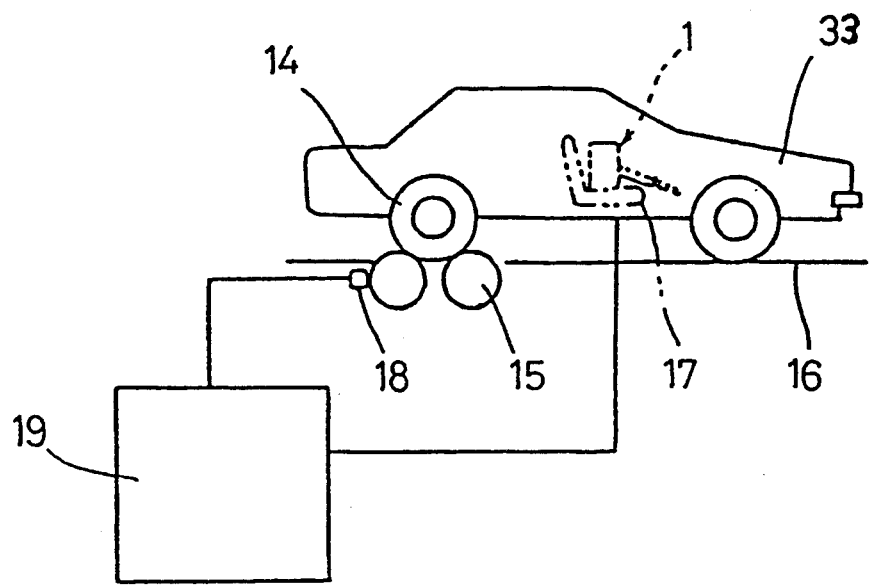
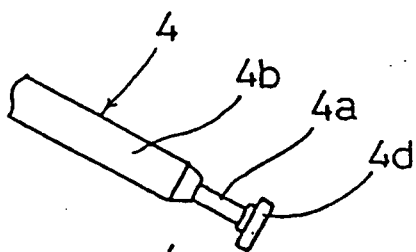
Fig.6 (A)
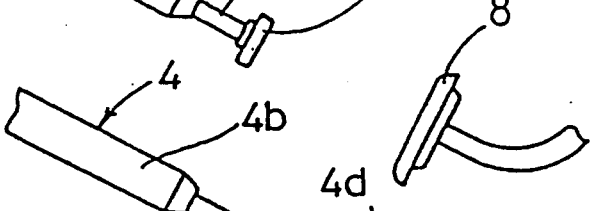
Fig.6 (B)
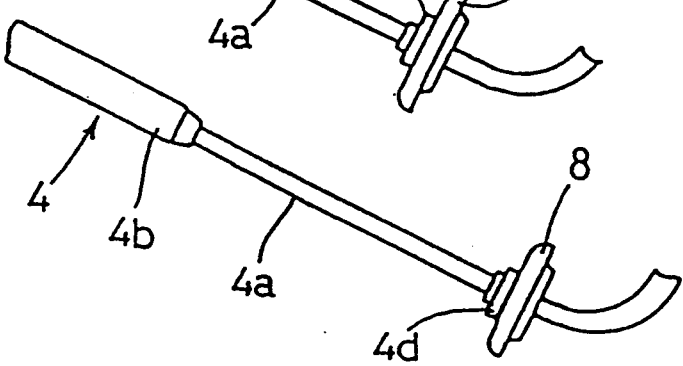
Fig.6 (C)

METHOD AND APPARATUS FOR CONTROLLING A ROBOT TO SIMULATE DRIVING OF A MOTORCAR

BACKGROUND OF THE INVENTION

1. Field of the Invention

The present invention relates to an apparatus and method of controlling a robot for automatically driving a motorcar in a simulation of car travel in which a driving wheel of the car is placed on a roller of a chassis dynamometer. With the car on the chassis dynamometer, dynamic performance tests of the motorcar can be conducted within a room.

2. Description of the Prior Art

A simulation of actual car travel driving by means of a chassis dynamometer has been used for dynamic performance testing of motorcars. Recently a motorcar driving robot (hereinafter referred to as a robot) adapted to individually drive a plurality of actuators by use of, for example, oil pressure, air pressure, DC servo motors, and the like, conducting stepping operations of an accelerator pedal, brake pedal, clutch pedal and the like of the automobile, as well as changeovers of a gear-change lever, has been used in such simulations of actual car travel driving. Thus, when car travel is referred to herein, the reader will understand that operation of the car on a chassis dynamometer is referred to, and not actual travel of the car as on a roadway.

In order to make a motorcar to be tested travel in a previously appointed travelling pattern by means of such a conventional driving simulation robot, the actuators operating the pedals and gear-change lever have been fixedly mounted on a chassis and then operating conditions of the respective pedals and gear-change lever have been manually produced, operating quantities and coordinates for operating the respective pedals and gear-change lever having been memorized by the driving simulation robot, and the respective actuators having been controlled by the use of such coordinates during a test driving.

However, in the above described conventional robot, the actuators are provided on a driver's seat of the motorcar by means of a suitable support member so as to face to the respective pedals and gear-change lever of the motorcar but shifts in position and disturbances in posture due to, for example, a vibration of the chassis, a catching of the gear-change lever during the operation, an over-stepping of the pedals, and the like, occur during such test driving and thus the respective actuators are shifted from the original positions thereof according to circumstances.

If the actuators are shifted in position in the above described manner, differences are produced between the memorized coordinates and the actual coordinates needed for operation of the clutch, brake, accelerator, and gear-change lever. Thus, the operating quantities of the actuators to be operated become unsuitable, whereby for example, suitable acceleration and deceleration and a changing-over operation of clutch and gear-change lever cannot be achieved well, or gears cannot be engaged due to a poor moving quantity of the gear-change lever. That is, the control of the motor car for it to achieve the appointed traveling pattern cannot be suitably achieved, and as a result a great hindrance is caused in the test travel.

SUMMARY OF THE INVENTION

The present invention has been achieved paying attention to the above described matters and it is an object of the present invention to provide a method of controlling a driving simulation robot capable of detecting shifted quantities of actuators of the robot, and to correct the detected shifted quantities, whereby surely achieving operations of pedals and the like by the actuators. In the case where the actuators of the driving simulation robot are shifted in position in a test driving, the robot will compensate for the shift in actuator position relative to the pedals and gear-change lever, and continue to properly operate these motorcar controls without interruption of the test in progress.

In order to achieve the above described object, in a method of controlling a motorcar driving simulation robot according to the present invention, the actuator operating an accelerator pedal, a brake pedal and a clutch pedal of a motorcar, respectively, is provided with a contact sensor to compare operating quantities of the actuator with the respective motorcar controls.

That is, when the actuator is brought into contact with the respective pedals and when operating ranges and operating characteristics of the respective controls are learned by the robot and compared with those when the respective actuators after being brought into contact with the respective pedals are then separated from the pedals during the time when the motorcar is driven, a determined difference between both operating quantities can be detected, and these respective differences are added to aimed controlling values of the respective actuators to control the respective actuator-controlling systems.

For example, the actuator for use on the accelerator pedal has a certain operating quantity of the actuator until it is brought into contact with the accelerator pedal. First, such an initial operating range and operating characteristic of the actuator for use on the accelerator pedal are recorded or memorized by the robot as an initial datum. Next, the operating quantity of the actuator for use on the accelerator pedal is recorded or memorized by the robot with the actuator brought into contact with the accelerator pedal and is used as an every-time datum. And, the every-time datum is compared with the initial datum to add a difference between them to an aimed controlling value of the actuator for use on the accelerator pedal, if such difference exists, to control a controlling system of the robot including the actuator for use on the accelerator pedal.

Such is also the case with the actuator for use on the brake pedal, and the actuator for use on the clutch pedal, the operating quantity is measured to be memorized in the same manner as in case of the actuator for use on the accelerator pedal. In addition, as to the actuator for use on the gear-change lever, a shifted quantity of the gear-change lever is calculated on the basis of shifted quantities in the respective controlling systems of the respective actuators of the accelerator, the brake, and the clutch and such shifted quantity is added to the aimed controlling value of the actuator for use on the gear-change lever to control the controlling system of the robot including the actuator for use on the gear-change lever. In other words, the shifts of the robot sensed with respect to the actuator portions for the accelerator, clutch and brake are used to derive a shifting value to be used in correcting the movements of the actuator for the gear-change lever.

BRIEF DESCRIPTION OF THE DRAWINGS

FIG. 5 is a diagram schematically showing one example of a chassis dynamometer; and FIG. 6 is a diagram for explaining a stepped condition of a pedal of a motorcar which is to be controllably moved by means of an actuator of the driving simulation robot.

DETAILED DESCRIPTION OF THE PREFERRED EMBODIMENTS

The preferred embodiments of the present invention will be below described with reference to the drawings.

Figure 3:
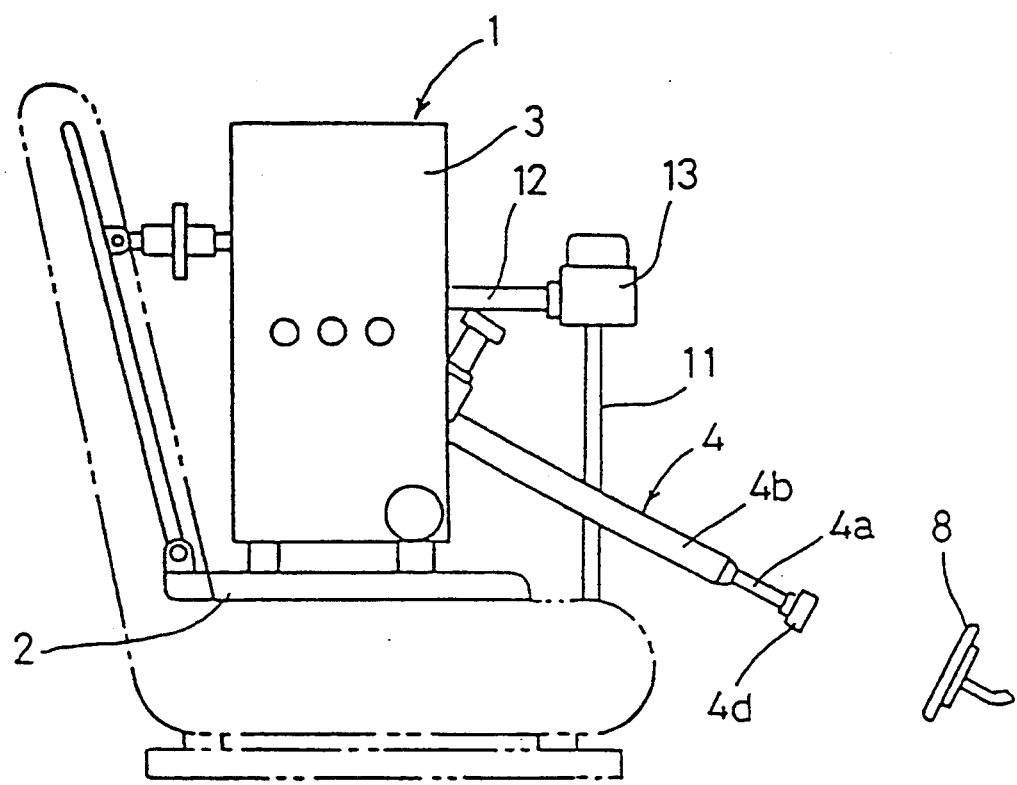
FIG. 3 is a side elevation view showing one example of a driving simulation robot controlled by the method according to the present invention.
Figure 4:
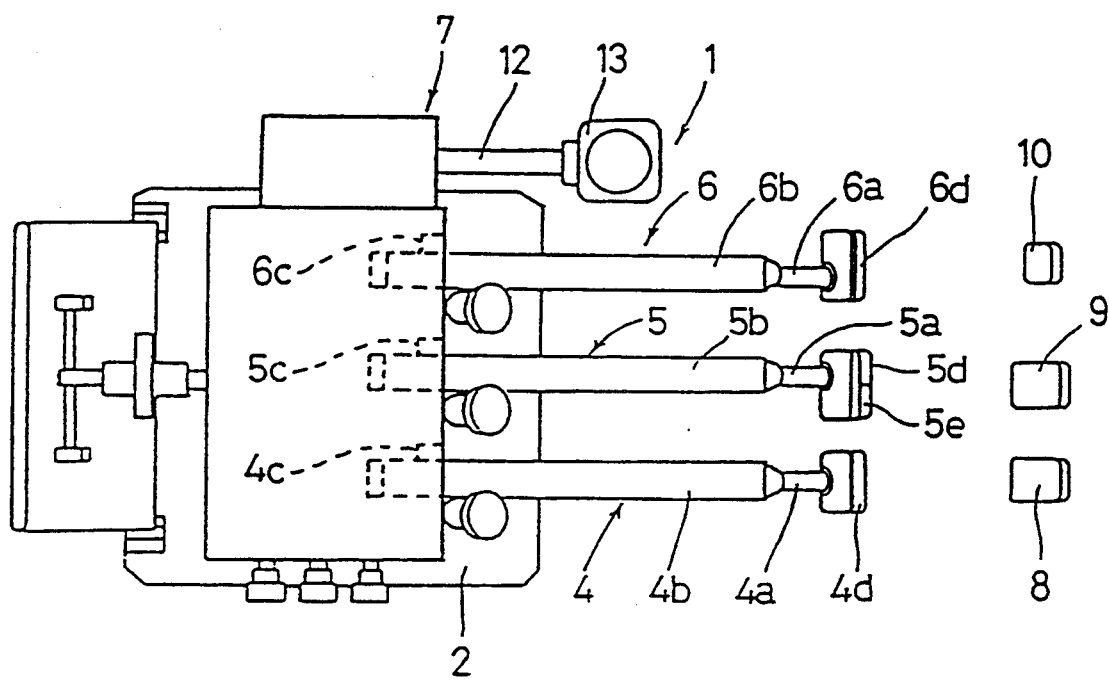
FIG. 4 is an enlarged plan view showing the robot seen in FIG. 3.

At first, FIGS. 3 and 4 show one example of a driving simulation robot (hereinafter referred to simply as a robot) for operating a motorcar, and which is controlled by a method according to the present invention. Referring to FIGS. 3 and 4, reference numeral 1 designates a robot with a base table 2 upon which a body 3 is mounted, an actuator 4 for use on an accelerator pedal, an actuator 5 for use on a brake pedal, an actuator 6 for use on a clutch pedal, and an actuator 7 for use on a gear-change lever all being provided on the body 3. The reader should note that the depicted embodiment of the robot 1 is configured for use with a right-hand drive motorcar. However, such is not a limitation on the invention, and the robot 1 could just as well be configured to operate the controls of a left-hand drive motorcar.

The actuator 4 for use on the accelerator pedal, the actuator 5 for use on the brake pedal, and the actuator 6 for use on the clutch pedal each include a respective support member 4b, 5b, 6b, respectively, and a respective slide arm 4a, 5a, 6a reciprocating on the support members by means of respective servomotors and the like (not shown). Also, each actuator 4, 5, 6 for use on the pedals is provided with a respective stroke sensor 4c, 5c, 6c, such as an encoder, detecting a stroke of the slide arm 4a, 5a, 6a, associated therewith.

In addition, each slide arm 4a, 5a, 6a is provided with a respective contact sensor 4d, 5d, 6d, such as a proximity switch, detecting a contact of the respective slide arm with an accelerator pedal 8, a brake pedal 9 and a clutch pedal 10. Furthermore, the slide arm 5a of the actuator 5 for use in the brake pedal is provided with a stepping force sensor 5e detecting a stepping force applied by the actuator 5 to the brake pedal 9.

The actuator 7 for use on the gear-change lever comprises a holder 13 having an internal inverted concave section (not shown), which is mounted on a forward end of a support arm 12 constructed so as to move a shift lever 11 in an X-axis direction, a Y-axis direction and a Z-axis direction. That is, the holder 13 may be manipulated by the actuator 7 in a side-to-side, and front-to-back directions for engaging the forward gears (and possibly the reverse gear) of the speed-change transmission of the motor car, as well as making possible the engagement of those reverse gears which require a downward motion of the gear-change lever in combination with an X-Y movement, by also providing for such a downward movement (Z direction) of the holder 13.

FIG. 5 schematically shows one example of a chassis dynamometer with a motorcar under test thereon. Referring to FIG. 5, reference numeral 33 designates a motorcar the travel of which on a roadway and under a variety of conditions of speed and acceleration, stopping, starting, an other particulars of a prescribed travel pattern are to be simulated using the chassis dynamometer and the robot 1. The motorcar is provided with a driving wheel 14 thereof placed on a chassis dynamometer 16 under the condition that the driving wheel 14 is in driving engagement on a roller 15 and the robot 1 is fixedly mounted on a driver's seat 17 thereof. Reference numeral 18 designates a detector detecting a rotational frequency of the roller 15. And, reference numeral 19 designates a control device in which the respective output signals from the stroke sensors 4c, 5c, 6c, the contact sensors 4d, 5d, 6d, the stepping force sensor 5e, and the detector 18, as well as other necessary data are put in to be memorized.

Figure 1:
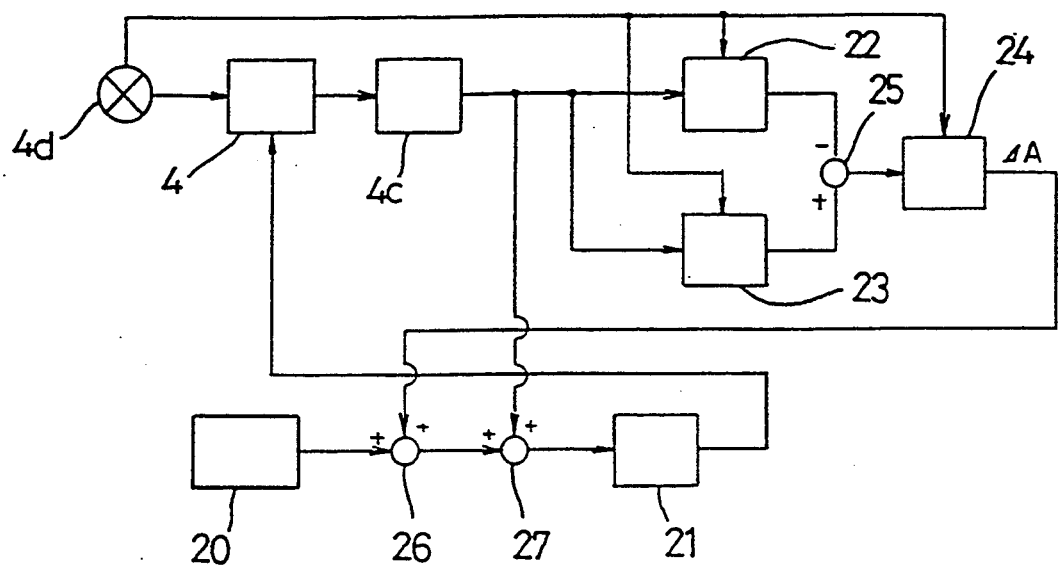
FIG. 1 is a block diagram showing one example of a controlling system for a motorcar accelerator control system.

Referring now to FIG. 1, one example of a controlling system for an accelerator system in the robot 1 having the above described construction is schematically depicted. Referring particularly to FIG. 1, reference numeral 20 designates an accelerator pedal-controlling target generator generating a controlling target value for controlling the actuator 4 to position the accelerator pedal 8 on the basis of an output from a target speed pattern generator (not shown). Reference numeral 21 designates an actuator for use in accelerator pedal-controlling system comprising a servomotor and the like, reference numeral 22 designates an initial data memory, reference numeral 23 designates an every time data memory, and reference numeral 24 designates a positional shift-correcting quantity operator. The members 20 to 24 are provided within the control device 19.

In addition, also a controlling system of a brake system and a controlling system of a clutch system have the same construction as in the controlling system of the accelerator system shown in FIG. 1 although they are not shown. That is to say, a brake pedal-controlling target generator and a clutch pedal-controlling target generator are used in place of the accelerator pedal-controlling target generator 20, respectively. Furthermore, a brake controlling servo system and a clutch-controlling servo system are used respectively in the same way as is the accelerator-controlling system 21.

A method of controlling the robot 1 having the above described construction will be below described with reference also to FIG. 6. Before the travelling performance test of the motorcar 33 is carried out by means of the robot 1, necessary matters are memorized by the robot. That is to say, at first the upper end portion of the gear-change lever 11 is held by means of the holder 13 of the actuator 7 for use in gear-changes, and by means of a manual controller (not shown) the robot is caused to memorize the neutral gear-change lever position, as well as the lever positions which correspond to each of the available gears of the change-speed transmission of the motorcar 33.

Next, in order to prepare the actuator 4 for use in positioning the accelerator pedal 8, the slide arm 4a housed in the support member 4b, as shown in FIG. 6(A), is extended so that the contact sensor 4d is brought into contact with the accelerator pedal 8 to put out a signal, as shown in FIG. 6(B). This position of initial extension of the slide arm 4a is memorized in the initial data memory 22 within the control device 19 as a stepping-starting position of the actuator 4 for use in selectively moving and positioning the accelerator pedal 8. That is, extension movement of the slide arm 4a beyond this initial slide arm position will be known as moving and positioning the accelerator pedal of the motorcar 33. In other words, the robot 1 will step on the accelerator pedal 8 by further extension of the slide arm 4a much as a human operator would step on this pedal in driving the motorcar 33. And, when the actuator 4 for use on accelerator pedal 8 steps on the accelerator pedal to the extent that further movement of the pedal is impossible, the extent of sliding movement of the slide arm 4a, as shown in FIG. 6(C), is memorized as a quantity of stroke of the accelerator pedal 8 by the actuator 4. This value of stroke for the accelerator pedal is detected by means of the stroke sensor 4c along with the stepping-starting position in the initial data memory 22.

And, also as to the actuator 5 for use on the brake pedal 9, and the actuator 6 for use on the clutch pedal 10, the respective quantities of stroke of the respective actuators 5, 6 are memorized in the initial data memory 22 by the respective output signals from the contact sensors 5d, 6d and the stroke sensors 5c, 6c. In addition, the brake pedal 9 is gradually stepped on by means of the actuator 5 for use on the brake pedal proceeding from the stepping-starting position until the greatest stepping position to memorize a stroke-length relation between quantities of stepping stroke of the actuator 5 for use on the brake pedal 9, along with the outputs (stepping forces) of the stepping force sensor 5e in another memory (not shown) of the controlling device 19. That is, the respective output signals from the stroke sensor 5c and the stepping force sensor 5e are correlated with the stroke length of movements of slide arm 5a during the time of brake application.

In addition, an engine of the motorcar 33 is started and the clutch pedal 10 is stepped until the greatest possible stepping position is reached by means of the actuator 6 for use on the clutch pedal, and the gearchange lever 11 is transferred from a neutral position to a first position by means of the actuator 7. Thereafter, a gradual retracting of the slide arm 6a of the actuator 6 for use on clutch pedal is effected, thereby returning the clutch pedal upwardly in a gradual movement. When the clutch of the motorcar is connected by this gradual releasing of the clutch pedal, the roller 15 of the chassis dynamometer 16 starts to rotate and this rotation is detected by the rotation detector 18 to put out a signal. Consequently, a clutch connection-starting position of the actuator 6 for use in clutch pedal movement is detected by means of the stroke sensor 6c on the basis of the signal from sensor 18 to be memorized in the initial data memory 22.

In a similar way, the shift lever 11 is transferred to the neutral position by means of the actuator 7 for use on the shift lever, followed by gradually stepping the accelerator pedal 8 from the stepping-starting position until the greatest possible stepping position by means of the actuator 4 for use on the accelerator pedal. During this time the engine of the motorcar is running free, and reaches free-running engine speeds which correspond to the positions of the throttle pedal 8. This exercise is used to memorize a relation between quantities of stepping stroke of the actuator 4 and rotational speeds of the engine in a memory (not shown) of the controlling device 19 by the respective output signals from the stroke sensor 4c and an engine rotational frequency-detecting means (i.e., a tachometer, which is not shown) during that time.

The actuator 4 for use on the accelerator pedal, the actuator 5 for use on the brake pedal, and the actuator 6 for use on the clutch pedal are operated in turn to conduct the learning of the robot 1 required for operating the accelerator pedal 8, the brake pedal 9 and the clutch pedal 10 by the respective output signals from the stroke sensors 4c, 5c, 6c, the contact sensors 4d, 5d, 6d, the stepping force sensor 5e, the rotation detector 18, and the engine rotational frequency-detecting means.

After these necessary preparations of the robot 1, the robot is used to conducting the patterned travel performance test of the motorcar 33, as above described, but only the control of the actuator 4 for use in moving and positioning the accelerator pedal will be representatively described below. Because the control of the accelerator pedal is representative of the similar control of the clutch and brake pedals, these latter controls will not be otherwise described.

The initial positional datum for the point of contact of the actuator 4 with the accelerator pedal 8 is used as a standard and is put out to the actuator-controlling system 21 for use in moving and positioning the accelerator pedal. This output is generated in response to the accelerator pedal-controlling target generator 20 as the controlling target value for controlling the actuator 4 on the basis of the output from the target speed pattern generator (not shown). The actuator-controlling system 21 for use on accelerator pedal puts out an instruction for extending the slide arm 4a by an appointed length on the basis of the controlling target value. Thus, the actuator 4 for use on accelerator pedal is extended toward the accelerator pedal 8 and stepped to make the engine of the motorcar accelerate, decelerate, hold a given speed, or otherwise contribute to the conducting of the appointed programmed pattern of motorcar travel.

During the dynamic operations of the robot 1, the slide arm 4a is retracted to the initial starting-stepping position, and is further retracted to detach the slide arm 4a from the accelerator pedal 8. This further contraction (which may have either a positive or a negative value) in order to separate the slide arm 4a from the accelerator pedal 8 is measured to be memorized in the every time data memory 23 of the control device 19. In other words, as the slide arm 4a retracts to release the accelerator pedal, contact between the accelerator pedal and the slide arm will be lost at, short of, or higher than the initial positional datum which is stored in memory 22. If contact between the throttle pedal and the slide arm is lost at the same location as the initial positional datum, this indicates no change of position between the robot 1 and the motorcar 33. On the other hand, a change in position of the point in retraction of slide arm 4a where contact with the accelerator pedal is lost indicates a shift of the robot 1 relative to the motorcar 33, which must be compensated for in future operations of the robot. The every time datum is compared with an initial datum memorized in the initial data memory 22 of the control device 19 followed by comparing at a butt point or summing junction 25 to calculate a difference in the positional shift-correcting quantity operator 24.

To reiterate here, if the difference is zero, in short, no positional shift is produced in the actuator 4 for use in moving and positioning the accelerator pedal, and the control of the actuator 4 for use on the accelerator pedal is conducted in the original coordinate system.

And, if the difference ΔA of certain magnitude is produced, the controlling target value of the actuator 4 for use on the accelerator pedal is corrected by the difference ΔA. That is to say, the difference ΔA is sent to a butt point 26 for correcting the target value to be used for correcting the controlling target value from the accelerator pedal-controlling target generator 20. The controlling target value corrected at the butt point 26 is sent to the accelerator-controlling system 21 with algebraic adding thereto of the quantity of stroke detected by means of the stroke sensor 4c at an adding point 27 for positionally controlling the actuator 4 for use on the accelerator pedal.

It goes without saying that the same control as the above described one in the actuator 4 for use on accelerator pedal can be conducted also as for the actuator 5 for use on brake pedal and the actuator 6 for use on clutch pedal.

Figure 2:
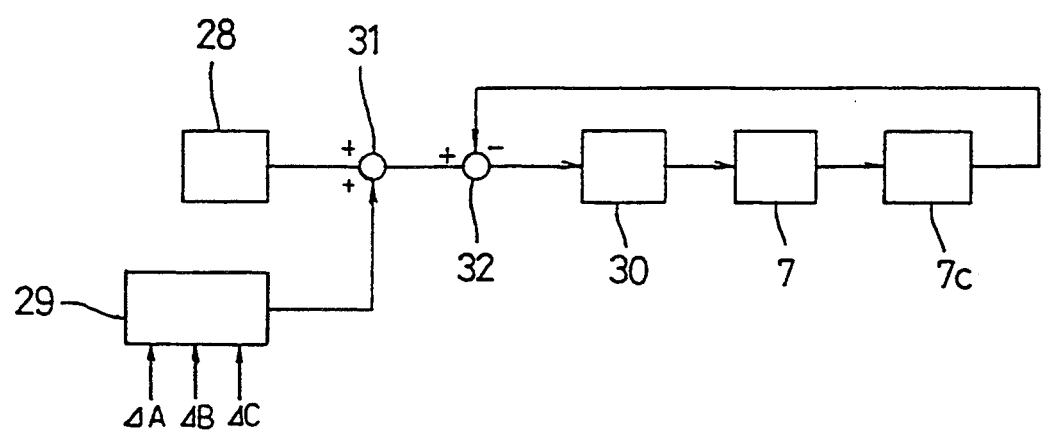
FIG. 2 is a block diagram showing one example of a controlling system for shifting gears of a motorcar by movements of the gear-change lever of the motorcar.

And, the actuator 7 for use on the gear-change lever is controlled by means of a gear-changing system as shown in FIG. 2.

That is to say, referring to FIG. 2, reference numeral 28 designates a shift pattern target generator generating the controlling target value for controlling the actuator 7 for use on the gear-change lever 11 on the basis of an output from the target gear-change portion of the patterned travel generator (not shown). Reference numeral 29 designates a differential shift corrector in which differences ΔA, ΔB, ΔC in the controlling systems of the respective actuators 4, 5, 6 determined in the way described above with respect to the accelerator actuator 4 are supplied. These differences are supplied to the positional shift correcting quantity operator, which is indicated with reference numeral 30, designating an actuator for use on the gear-change lever-controlling system comprising a servomotor and the like, via a junction referenced with the numeral 31, and designating a butt point for correcting the target value, and another junction referenced with the numeral 32 designating an adding point for positionally controlling the actuator 7 for use in moving and positioning the gear-change lever 11.

In view of the above, a difference (S) is determined on the basis of the differences ΔA, ΔB, ΔC in the controlling systems of the respective actuators 4, 5, 6 to shift the controlling target value for the actuator 7 for use on gear-change lever-controlling system 30, in accord with the magnitude and sign to the difference (S). As will be easily appreciated, the correction value for the actuator 7 includes X-Y-Z values which may be simply derived trigonometrically from the correction factors used for the accelerator, brake, and clutch pedals. That is, the separation of these pedals, in conjunction with the magnitudes and signs of the correction factors necessary for use with each allows a correction factor to be derived for use with the gear-change lever controller which includes three-dimensional correction information.

As above described, according to the present invention, positional shift quantities of the respective actuators for use in accelerator pedal, brake pedal, clutch pedal and gear-change lever are always measured to control the respective actuators with algebraic adding of the positional shift quantities, so that the sure and precise control of the motorcar 33 can be continued the despite the positional shifts of the robot 1 which may occur during a simulated travel test of the motorcar, and within an operational range of the control system. Accordingly, even though the actuators of the robot are positionally shifted during the test travel, the travelling test of the motorcar can be suitably achieved. Further, an alarm can be provided if the magnitude of the positional shifts approaches the limits of the operational range of the robot during a test. Consequently, a human attendant may conduct a resetting of the robot before its operational range is exceeded and while a test is still in progress, if desired, thereby preventing the control of the motorcar within the parameters of the selected travel pattern from becoming impossible.

What is claimed is:

1. A method of dynamically adjusting a robot for simulated driving of a motorcar to compensate for movement of the robot relative to the motor car during operation of the robot, said method including the steps of:

bringing an actuator of the robot into contact with a control of the motor car and recording the initial position of contact, using the actuator of the robot to operate the motorcar control during the simulated driving thereof, retracting the actuator of the robot and sensing the position at which contact with said control is lost, generating a correction factor indicative of a difference between said initial contact position and said loss of contact position, and using said correction factor to adjust operation of the motorcar control by said robot by correcting the motion of said actuator to contact said control.

2. The method of claim 1 wherein said step of bringing said actuator of said robot into engagement with a control of said motorcar includes extending an extensible actuator of the robot into engagement with one of a throttle pedal, brake pedal, or clutch pedal of said motorcar.

3. The method of claim 2 further including the steps of using said robot to operate the motorcar control through its complete range of motion, and recording the extension of said extensible actuator which is required to achieve said complete range of motion of said control.

4. The method of claim 3 further including the steps of bringing said actuator into engagement with said throttle pedal of said motorcar, accelerating an engine of said motorcar by extension of said actuator, and recording the correlation between extension of said actuator and speed of operation of said motorcar engine.

5. The method of claim 4 wherein said step of using said correction factor to adjust operation of said motorcar control by said robot includes the algebraic adding of said correction factor to said contact position, and the operation of said motorcar control by said robot thereafter with the result of said addition as a datum for movement of said control by said robot.

6. The method of claim 1 further including the operation of a brake pedal of said motorcar with said robot, the movement of said brake pedal through its complete range of motion while recording a stepping-force required of said robot to achieve said complete range of motion, and correlation of said stepping force with said range of motion of said brake pedal.

7. The method of claim 1 further including the operation of a clutch pedal of said motorcar with said robot, the engagement of a road wheel driving gear of a transmission of said motorcar, and the release of said clutch by said robot actuator while an engine of the motorcar is operating with sensing of engagement of said clutch by initiation of rotation of said road wheel, and recording the position of said actuator corresponding to engagement of said clutch.

8. The method of claim 1 further including the provision of respective actuators of said robot for each of an accelerator pedal and a brake pedal of said motorcar, and the recordation of a correction factor corresponding to each of said respective actuators for use in operation of said brake and accelerator pedals.

9. The method of claim 8 further including the provision on said robot of an actuator for operation of a gear-change lever of said motorcar, and the use of said correction factors for said accelerator and brake in correction of operation of said gear-change lever actuator.

10. The method of claim 9 wherein said gear-change actuator is movable in orthogonal X-Y directions, and corrections for each of said orthogonal directions are derived for said gear change actuator by use of said correction factors for said accelerator pedal and brake pedal.

11. Apparatus for control of an actuator of a robot for simulated driving of a motorcar, said apparatus comprising:

means for sensing a condition of contact between said actuator and a control of said motorcar, first memory means for recording a first position of said actuator upon initial contact thereof with said motorcar control, means for sensing an extent of movement of said actuator, prime mover means moving said actuator in response to operation of said prime mover, means for generating a command moving said actuator via operation of said prime mover of said actuator, said command generating means also commanding movement of said actuator resulting in disengagement thereof from said motorcar control, second memory means for recording a second position of said actuator upon disengagement of said actuator from said motorcar control, comparison means for comparing said first position with said second position and providing a correction factor in response to a difference therebetween, and means for modifying said command in accord with said correction factor, thereby to compensate said robot for relative movements between the robot and the motorcar to result in fidelity of operation of said motorcar control by said robot despite said relative movements.

12. The apparatus of claim 11 further including another actuator moving another control of said motorcar, command means providing a second command for commanding movement of said another actuator via another prime mover moving said another actuator in response to operation thereof, means for sensing a position of said another actuator relative said robot, means receiving said correction factor, and a differential shift corrector providing a second correction factor indicative of a changed position of said robot relative said motorcar, and means of modifying said second command in view of said second correction factor, thereby to maintain fidelity of operation of said another motorcar control via said robot despite relative movements between said motorcar and said robot.

13. A method of controlling a robot to simulate driving of a motorcar, said method comprising the steps of:

providing an actuator operating each of an accelerator pedal, a brake pedal, and a clutch pedal of said motorcar with a respective contact sensor, comparing operating quantities of the respective actuators until they are brought into contact with the respective pedals, causing the robot to memorize the respective ranges and operating characteristics of the respective actuators with those after the respective actuators are brought into contact with the respective pedals, and with those when the respective actuators are separated from the respective pedals during operation of the motorcar by the robot, determining difference values between the operating quantities with the pedals engaged by the actuators and with the actuators disengaged from the pedals, and adding said difference values to target values controlling movements of the respective actuators to control the movements of the respective motorcar pedals by the robot.

14. The method of claim 13 further including the steps of providing said robot with a gear-change actuator movable in three dimensions (X-Y-Z) for operation of a gear-change lever of said motorcar, and using said difference values to compensate movements of said gear-change lever by said gear-change actuator, whereby fidelity of operation of said gear-change lever by said gear-change actuator is maintained despite relative position change between said robot and motorcar.

* * * * *